US007024512B1

(12) United States Patent
Franaszek et al.

(10) Patent No.: US 7,024,512 B1
(45) Date of Patent: Apr. 4, 2006

(54) COMPRESSION STORE FREE-SPACE MANAGEMENT

(75) Inventors: Peter Anthony Franaszek, Mount Kisco, NY (US); Philip Heidelberger, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/021,333

(22) Filed: Feb. 10, 1998

(51) Int. Cl.
*G06F 12/00* (2006.01)
*G06F 9/00* (2006.01)

(52) U.S. Cl. ............... 711/100; 711/154; 711/170; 711/104; 707/101; 704/500

(58) Field of Classification Search ........... 711/100, 711/154, 170, 104; 707/101; 704/500, 503; 710/68
See application file for complete search history.

(56) References Cited

U.S. PATENT DOCUMENTS

| 5,237,460 | A | * | 8/1993 | Miller ........................ 360/8 |
| 5,237,669 | A | * | 8/1993 | Spear ........................ 395/400 |
| 5,394,534 | A | * | 2/1995 | Kulakowski ............... 395/425 |
| 5,696,926 | A |   | 12/1997 | Culbert et al. |
| 5,699,539 | A | * | 12/1997 | Garber et al. ............. 395/402 |
| 5,710,909 | A | * | 1/1998 | Brown ..................... 395/497.01 |
| 5,761,536 | A |   | 6/1998 | Franaszek |
| 5,915,129 | A | * | 6/1999 | Slivka et al. ................ 710/68 |
| 6,038,571 | A | * | 3/2000 | Numajiri .................. 707/206 |
| 6,092,171 | A | * | 7/2000 | Relph ........................ 711/203 |
| 6,366,289 | B1 | * | 4/2002 | Johns ........................ 345/543 |

FOREIGN PATENT DOCUMENTS

EP    0 788 053 A2    1/1999

WO    99/ 00237    5/1998

OTHER PUBLICATIONS

IBM Research Division—On Management of Free Space in Compressed Memory Systems, Oct. 22, 1998.*

(Continued)

*Primary Examiner*—Kimberly McLean-Mayo
(74) *Attorney, Agent, or Firm*—Derek S. Jennings; McGinn & Gibb, PLLC

(57) ABSTRACT

An improved method, system, and a computer program storage device (e.g., including software embodied on a magnetic, electrical, optical, or other storage device) for management of compressed main memory allocation and utilization which can avoid system abends or inefficient operation that would otherwise result. One feature reduces (and ultimately eliminates) all unessential processing as the amount of available storage decreases to a point low enough to threaten a system abend. In another example, the amount of current memory usage is determined as well as one or more of: an estimate of an amount of allocated but unused memory; a determination of the amount of memory required for outstanding I/O requests. The compressed memory is managed as a function of the current memory usage and one or more of the other measured or estimated quantities. The compressed memory can be managed by maintaining a set of dynamic thresholds; estimating the amount of storage that can easily be freed (used but available) and the amount of storage that is committed (allocated but unused). The estimate of committed storage can include: the current storage utilization; and an estimate of storage committed to new pages (based on the number of new pages granted), the times at which this was done, the estimated compression ratio, and estimates of residency times in the cache.

97 Claims, 8 Drawing Sheets

OTHER PUBLICATIONS

A. S. Tanenbaum, "Modern Operating Systems," SEC. 3.4.5. The Clock Replacement Algorithm, Prentice Hall, Englewood Cliffs, N.J., pp. 111 (1992).

J. Ziv & A. Lempel, "A Universal Algorithm for Sequential Data Compression," IEEE Transactions On Information Theory, IT-23, pp. 337-343 (1997).

D. A. Patterson & J. L. Hennessy, "Computer Architecture A Quantitative Approach," 2nd Edition, Morgan Kaufmann Publishers, Inc., San Francisco, CA, pp. 445-446 (1996).

Helen Custer, "Inside Windows NT," Microsoft Press, pp. 184-202 (1993).

* cited by examiner

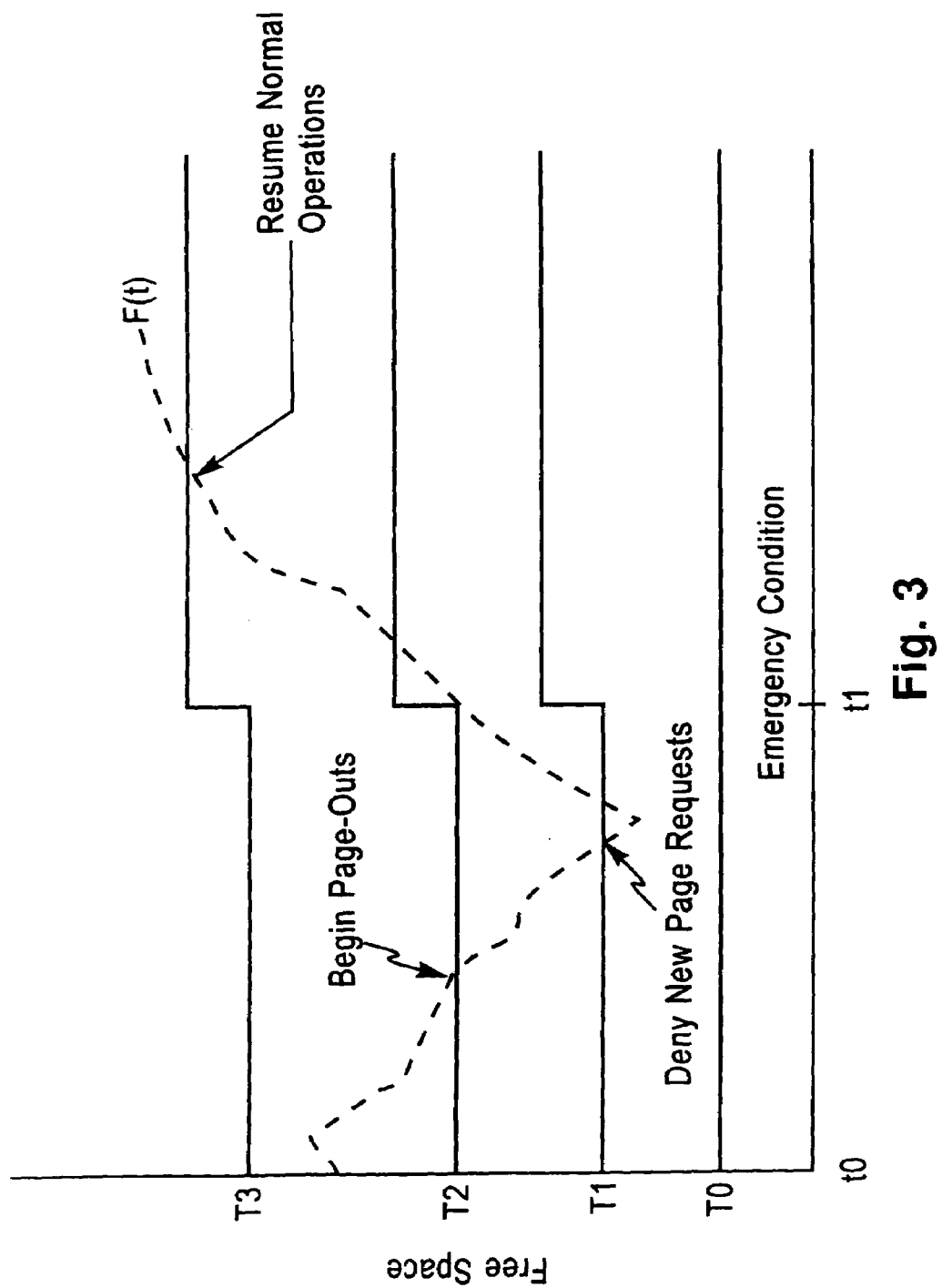

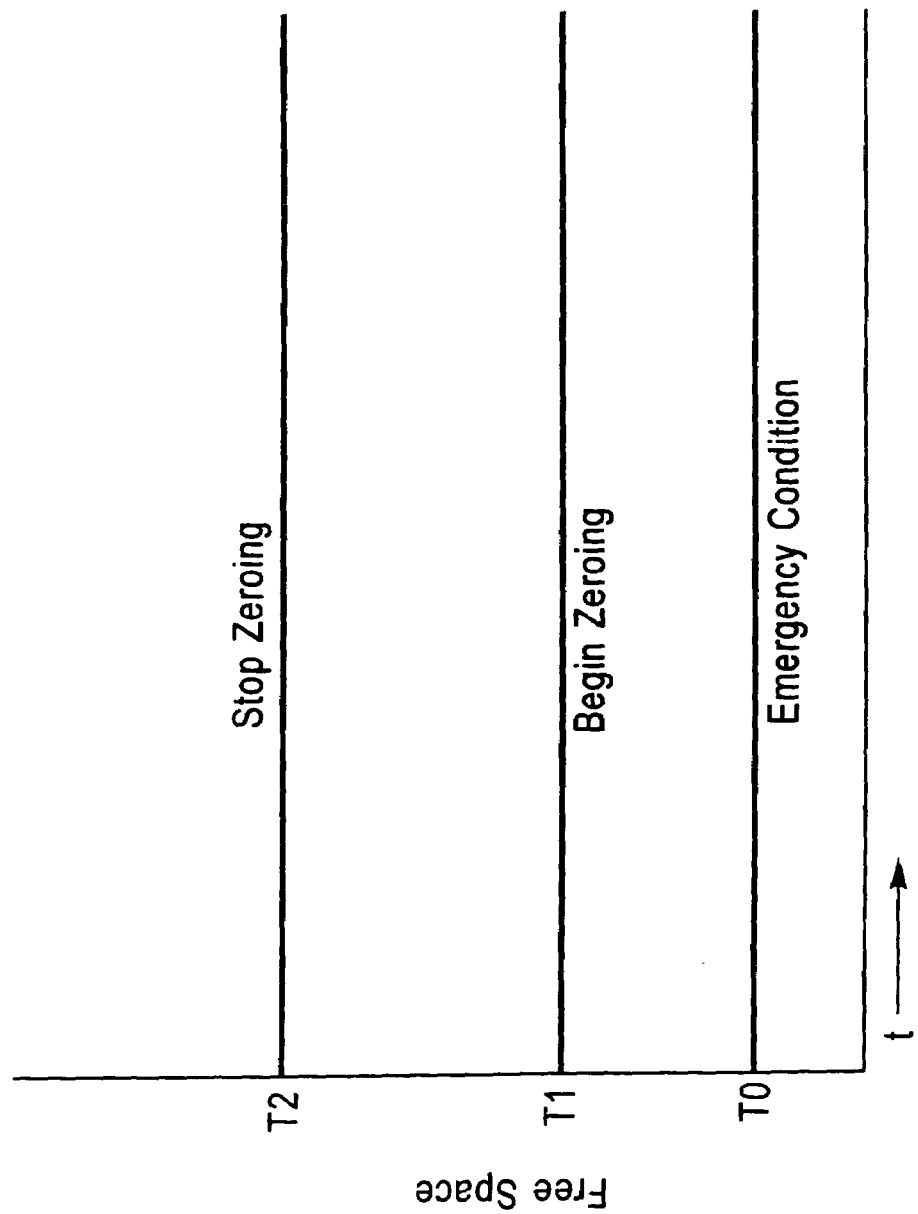

COMPRESSION STORE FREE-SPACE MANAGEMENT

CROSS-REFERENCE TO RELATED PATENT APPLICATIONS

The present invention is related to the following co-pending patent applications: Compression Store Addressing, by Franaszek, Ser. No. 08/603,976, filed Feb. 20, 1996, System and Method for Reducing Memory Fragmentation by Assigning Remainder to Shared Memory Blocks on a Best Fit Basis, by Franaszek, Ser. No. 08/701,143, filed Aug. 21, 1996, and Space Management in Compressed Main Memory, by Franaszek at al., Ser. No. 08/859,865, filed May 21, 1997, These co-pending patent applications are commonly assigned IBM Corporation, Armonk, N.Y. and are hereby incorporated herein by reference in their entirety.

FIELD OF THE INVENTION

This invention relates in general to operating systems for computers, and in particular to managing compressed main memory in a computer system.

BACKGROUND

An emerging development in computer organization is the use of data compression for the contents of main memory, that part of the random access memory hierarchy which is managed by the operating system ("OS") and where the unit of allocation is a page.

In compressed memory systems, a page may occupy a variable amount of physical memory space. For example, as described in the aforementioned related patent applications, pages occupy or share a variable number of fixed size blocks; pages may be of nominal 4K size and blocks of size 256 bytes. Generally, the number of such blocks occupied by a page will vary with its contents, due to changes in compressibility.

Typically, each cache line is compressed prior to being written into memory, using a standard sequential or a parallel compression algorithm. Examples of sequential compression include Lempel-Ziv coding (and its sequential and parallel variations), Huffman coding and arithmetic coding. See, for example, J. Ziv and A. Lempel, "A Universal Algorithm For Sequential Data Compression," IEEE Transactions on Information Theory, IT-23, pp. 337–343 (1977) which is hereby incorporated by reference in its entirety. A parallel approach is described in co-pending U.S. patent application Ser. No. 08/498,948, entitled Parallel Compression and Decompression Using a Cooperative Dictionary, by Franaszek et al., filed on Jul. 6, 1995 ("Franaszek"). The Franaszek patent application is commonly assigned with the present invention to IBM Corporation, Armonk, N.Y. and is hereby incorporated herein by reference in its entirety. A convenient way to perform this compression is by automatically compressing the data using special-purpose hardware, with a minimum of intervention by the software or operating system. This permits compression/decompression to be done rapidly, avoiding what might otherwise be long delays associated with software compression/decompression.

Changes to a page stored in main memory occur on write backs from the cache. That is, a changed cache line may require a larger number of blocks on write back, than previously. If there are an insufficient number of free blocks to hold the changed line, the system abends. Thus, there is a need to maintain adequate free space under fluctuating compression efficiencies. There is also a need as in current operating systems, to maintain adequate free space for new pages, or pages to be brought into main memory from disk storage. The present invention addresses these needs.

A difference between a system of this kind, and a traditional system (without compression) is that in the traditional system, allocation (also called commitment) of a page to a program is the same as allocating a "page frame," that is, real storage, as opposed to some unknown number of blocks (after compression). Moreover, after allocation, the contents of a new page must be written back to storage from the cache, so that there is a variable delay between storage allocation and storage utilization. During this variable delay, the corresponding storage will be referred to as being "allocated but unused." Also, in general, there is no indication to the application or system software when a given line is cast out from the cache. Thus, there is uncertainty related to the amount of storage that has been committed to new pages, but which is not yet reflected in storage utilization. A consequence is the possible over commitment of storage and the accompanying performance degradation and/or system abends. The present invention addresses these problems.

SUMMARY OF THE INVENTION

Accordingly, the present invention is directed to an improved method, system, and a computer program storage device (e.g., including software embodied on a magnetic, electrical, optical, or other storage device) for management of compressed main memory allocation and utilization. The present invention has features which advantageously avoid system abends or inefficient operation that would otherwise result.

The present invention has features which may be implemented as a computerized method or a computer program storage device embodying computer software for determining whether a request for some number of pages can be granted, and controlling the number of pages to be written out to disk, and the times at which this is done. In addition, the present invention has other features for reducing (and ultimately ceasing) all non-essential processing as the amount of available storage decreases to a point low enough to threaten a system abend.

An example of a computerized method or computer program storage device embodying computer software having features of the present invention includes the steps of: determining an amount of current memory usage and estimating an amount of allocated but unused memory; and managing the compressed memory as a function of the current memory usage and the amount of allocated but unused memory.

In another example, a computerized method or computer program storage device embodying computer software having features of the present invention includes the steps of: determining an amount of current memory usage and determining an amount of memory required for outstanding I/O requests; and managing the compressed memory as a function of the current memory usage and the amount of memory required for outstanding I/O requests.

In a preferred embodiment, the compressed memmory can be managed by maintaining a set of thresholds; estimating the amount of storage that can easily be freed (used but available) and the amount of storage that is committed (allocated but unused). The estimate of committed storage can include: the current storage utilization (supplied by the hardware); and an estimate of storage committed to new pages (based on the number of new pages granted), the times at which this was done, the estimated compression ratio, and estimates of residency times in the cache.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 3 depicts one example of the compressed memory management process in a system without a Reclaim list;

FIG. 4 depicts one example of the compressed memory management process in a system with a Reclaim list.

DETAILED DESCRIPTION

In accordance with the principles of the present invention, expansion of the contents of memory is controlled in order to ensure sufficient space is available to store, for instance, compressed data. One example of a computing environment incorporating and using the present invention is described in detail with reference to FIG. 1a.

Figure 1A:
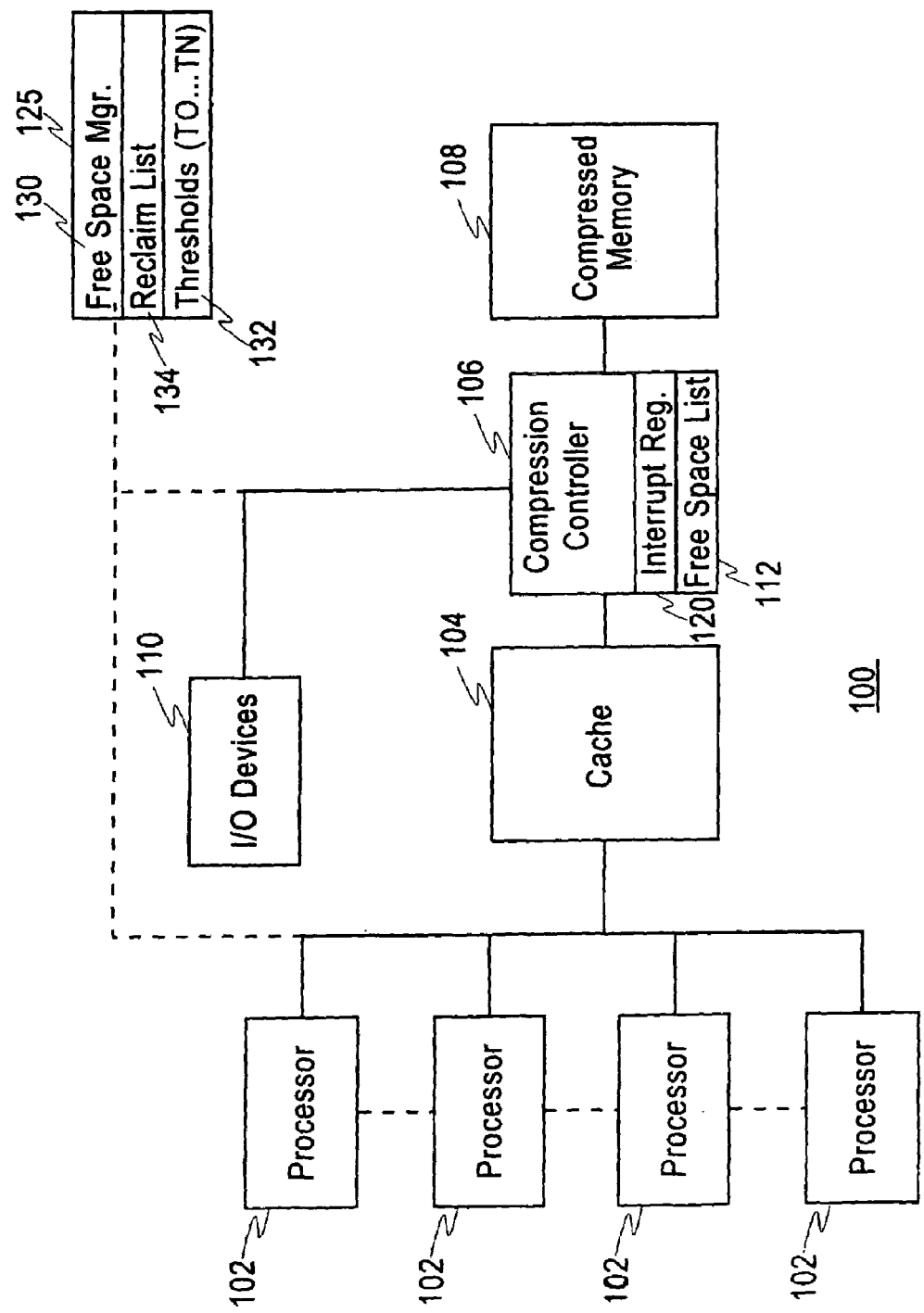
FIG. 1a depicts one example of a computing environment incorporating and using the memory management capability of the present invention.

FIG. 1a depicts one example of a block diagram of a computing system 100 incorporating the compressed memory management capability of the present invention. In one embodiment, the computing system 100 includes a large server system, which except for the compression controller 106 (described below) is offered by International Business Machines Corporation under the trademark RS/6000. As depicted, the computing system 100 includes, for example, one or more processors 102, operating system 125, a cache 104, a compression controller 106, compressed main memory 108 and one or more input/output ("I/O") devices 110, each of which is described in detail below.

As is known, processor(s) 102 are the controlling center of the computing system 100. The processor(s) 102 execute at least one operating system ("OS") (125) which controls the execution of programs and processing of data. Examples include but are not limited to an OS such as that sold under the trademark AIX by International Business Machines ("IBM") Corporation and an OS sold under the trademark WINDOWS NT by the Microsoft Corporation. As will be described below, the operating system 125 is one component of the computing environment 100 that can incorporate and use the capabilities of the present invention.

Coupled to the processor(s) 102 and the compression controller 106 (described below) is a cache memory 104. The cache memory 104 provides a short term, high-speed, high-capacity computer memory for data retrieved by the compression controller 106 from the I/O devices 110 and/or the compressed main memory 108.

Coupled to the cache 104 and the compressed memory 108 is the compression controller 106, (described in detail below) which manages, for example, the transfer of information between the I/O devices 110 and the cache 104, and/or the transfer of information between the compressed main memory 108 and the cache 104. Functions of the compression controller include the compression/decompression of data; and the storing of the resulting compressed lines in blocks of fixed size. As will be described with reference to FIG. 1c, this preferably includes a mapping from real page addresses, as seen by the operating system, to addresses of fixed-size blocks in memory.

The compressed main memory 108, which is also coupled to the compression controller 106, contains data which is compressed, for example, in units of cache lines. In one embodiment, each page includes four cache lines. Cache lines are decompressed and compressed respectively when inserted or cast-out of cache 104. Pages from I/O devices 110 are also compressed (in units of cache lines) on insertion into main memory 108. In this example, I/O is done into and out of the cache 104. Although a single cache is shown, for simplicity, an actual system may include a hierarchy of caches.

Figure 1B:
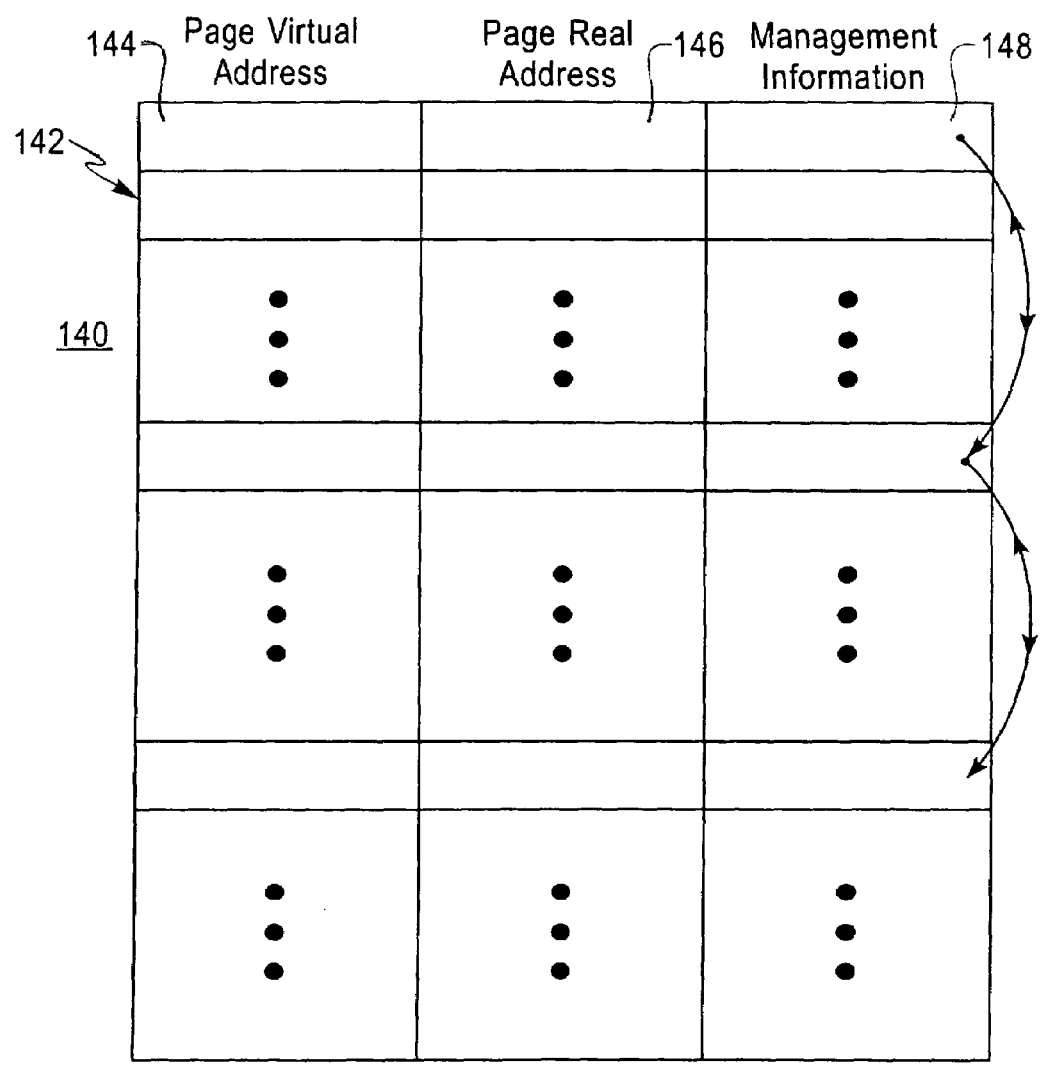
FIG. 1b depicts one illustration of a page table.
Figure 1C:
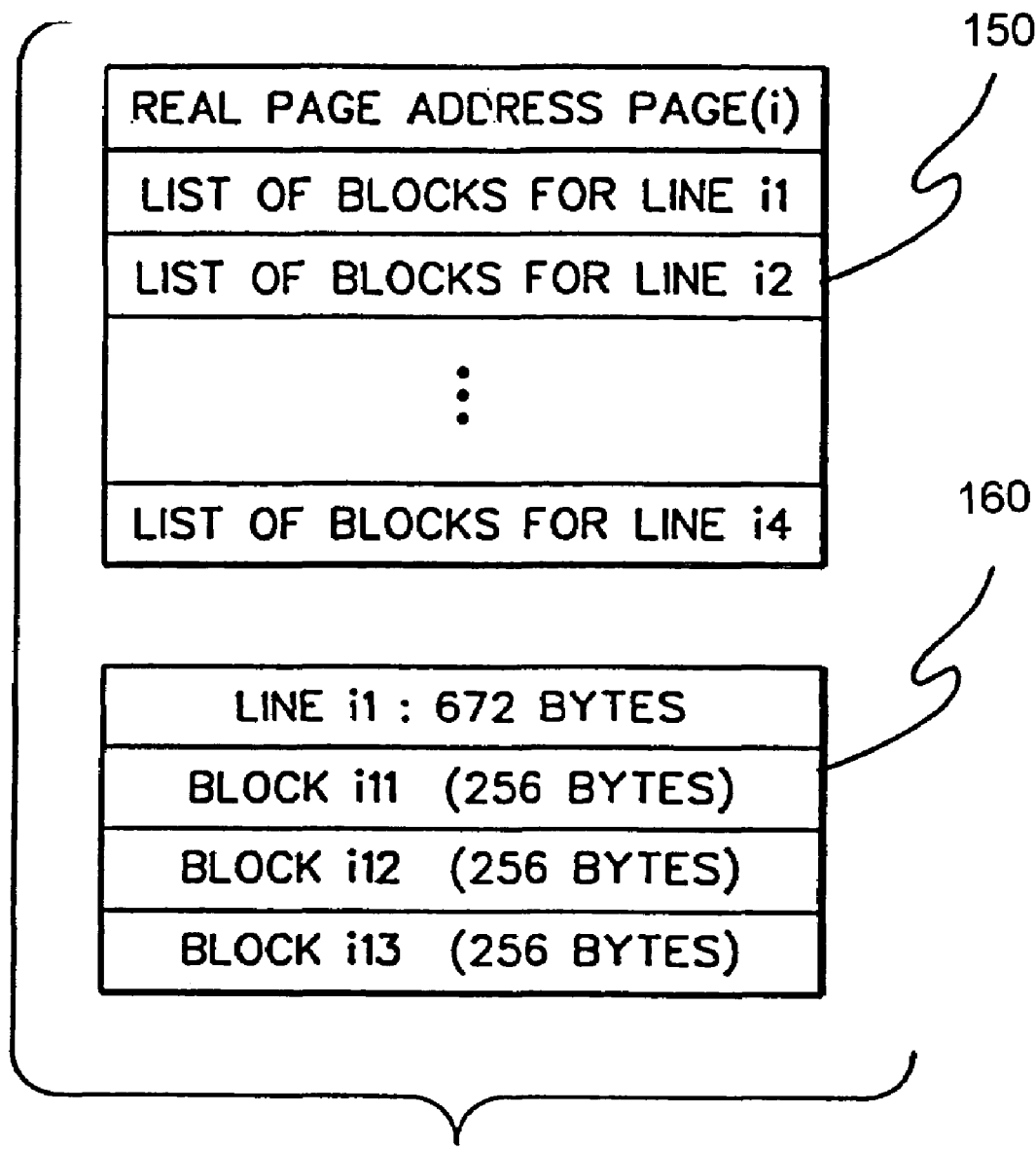
FIG. 1c depicts one example of the organization of physical addresses of pages of compressed main memory.

As is well known, information relating to pages of memory can be stored in one or more page tables in the main memory or the cache 104 and is used by the OS 125. One example of a page table 140 is depicted in FIG. 1b. Page table 140 includes a plurality of page table entries 142 and each entry includes, for instance, a virtual address 144 for a given page; a real address 146 corresponding to the virtual address for that page; and a set of management information 148 for the page, for example, a use bit field indicating whether the page has been referenced and a read/write or read-only access field indicating the allowed type of access.

The real address of a page is mapped into a set of physical addresses (e.g., identifiers of blocks of storage) for each cache line, when the page is requested from main memory 108. In one example, this is accomplished using tables 150 and 160, illustrated in FIG. 1c. These tables can be stored in the compression controller 106. Table 150 includes, for instance, what is termed the real page address for a page, Page (i), as well as a list of the memory blocks for each line of the page. For example, each page could be 4 k bytes in size and includes four cache lines. Each cache line is 1 k bytes in size.

Compressed cache lines are in fixed-size blocks of 256 bytes, as one example. Table 160 includes, for instance, the compressed blocks making up a particular line of Page (i). For example, line 1 of Page (i) includes three compressed blocks, each having 256 bytes. Since, in this example, each page can include up to four cache lines and each cache line can include up to four compressed blocks of memory, each page may occupy up to 16 blocks of memory.

Referring again to the system depicted in FIG. 1a, in accordance with the present invention, the compression controller 106 can include one or more interrupt registers 120 and a free-space list 112. One implementation of the free-space list is as a linked list, which is well known to those of skill in the art.

Here, the compression controller 106 performs various functions, including:

a) Compressing lines which are cast out of the cache 104, and storing the results in some number of fixed-size blocks drawn from the free-space list 112;
b) Decompressing lines on cache fetches;
c) Blocks freed by operations such as removing a line from memory, or compressing a changed line which now uses less space, are added to the free-space list 112;
d) Maintaining a count F of the number of blocks on the free-space list 112. This count is prefereably available to the OS 125 on request;
e) Maintaining a set of thresholds implemented as interrupt registers (120) on the size of F. Changes in F that cause thresholds to be crossed (described in detail below) cause a processor interrupt. Preferably, each threshold can be dynamically set by software and at least those related to measured quantities are stored in an interrupt register 120 in the controller 106.

According to the present invention, the free-space manager 130 maintains an appropriate number of blocks on the free-space list 112. Too few such blocks causes the system to abend or suspend execution of applications pending page-outs, while having too many such blocks is wasteful of storage, producing excessive page faults. The free-space manager also sets the interrupt registers 120 with one or more thresholds (T0 . . . TN) at which interrupts are generated. As stated, threshold values which are related to actual measured values, as opposed to periodically measured values, are stored in one or more interrupt registers 120. Examples of thresholding policies and control processes having features of the present invention will be described in detail below.

Those skilled in the art will appreciate that there are various alternative implementations within the spirit and scope of the present invention. For example, various functions embodied in the compression controller 106 can be performed by other hardware and/or software components within the computing environment 100. As one example, the compressed memory management technique can be performed by programs executed by the processor(s) 102.

In a system without memory compression, the allocation of a page to a program by the operating system corresponds exactly to the granting of a page frame. That is, there is a one-to-one correspondence between addresses for pages in memory and space utilization. This is not the case here, since each line in a page can occupy a variable number of data blocks (say 0, to 4 as an example). Moreover, the number of blocks occupied by a given line may vary as it is modified.

These variations, occurring at processor speeds, may lead to memory-usage expansions which are much faster than can be handled by the page-out mechanism. Thus there is a need under some conditions to stop all application processing while page-outs are in progress.

Another difference between the operation of the current system and a conventional one is that there will in general be a delay between granting a page, and its full utilization of memory. Failure to account for such delayed expansion can mean an over commitment of memory space and an increased likelihood of rapid expansion. The result may be an oscillation between granting too many pages and halting all processing while the resulting required page-outs are pending. The present invention avoids such compression-associated memory thrashing.

Figure 2A:
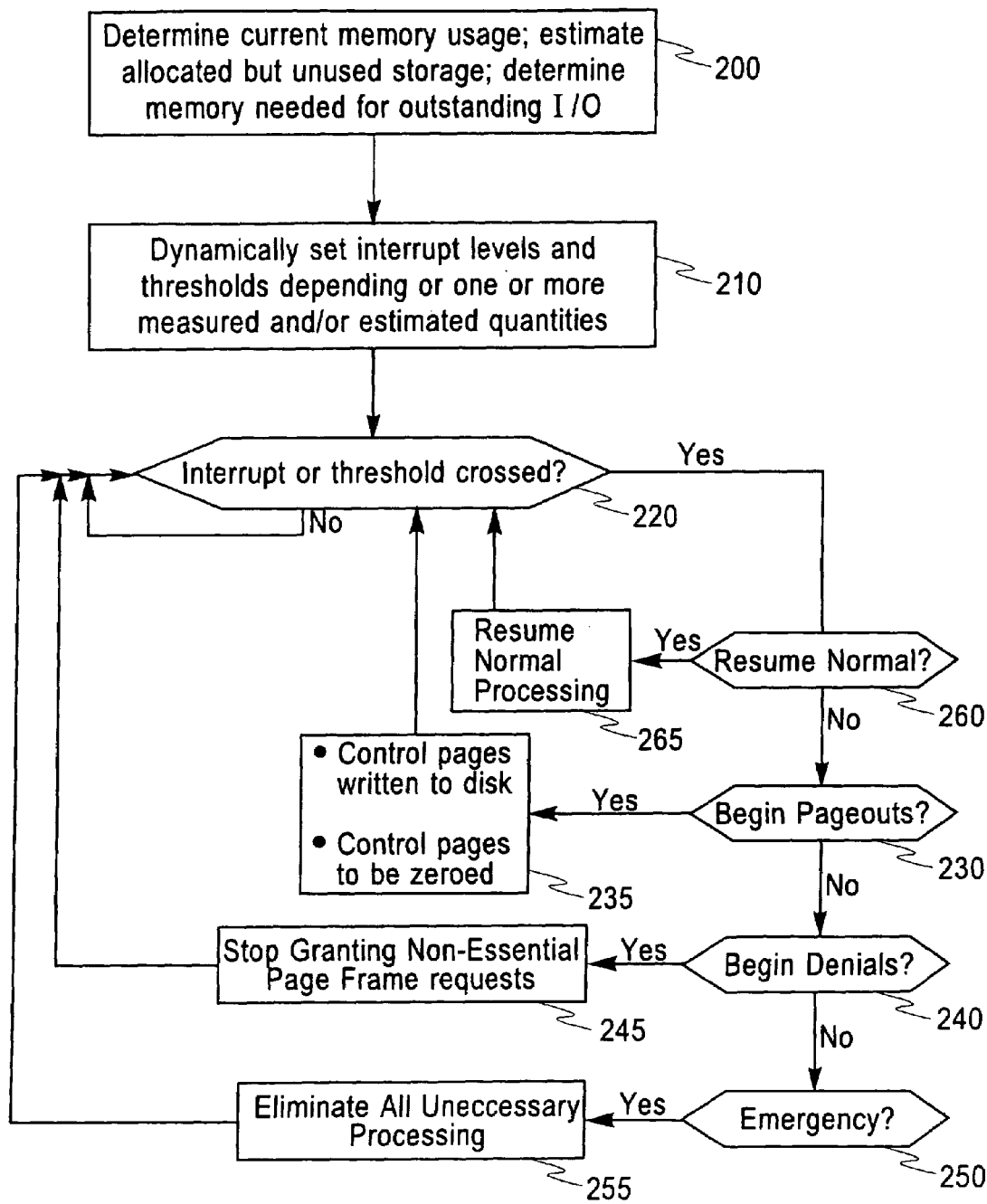
FIG. 2a depicts an example of a method for managing compressed memory in accordance with the present invention.
Figure 2B:
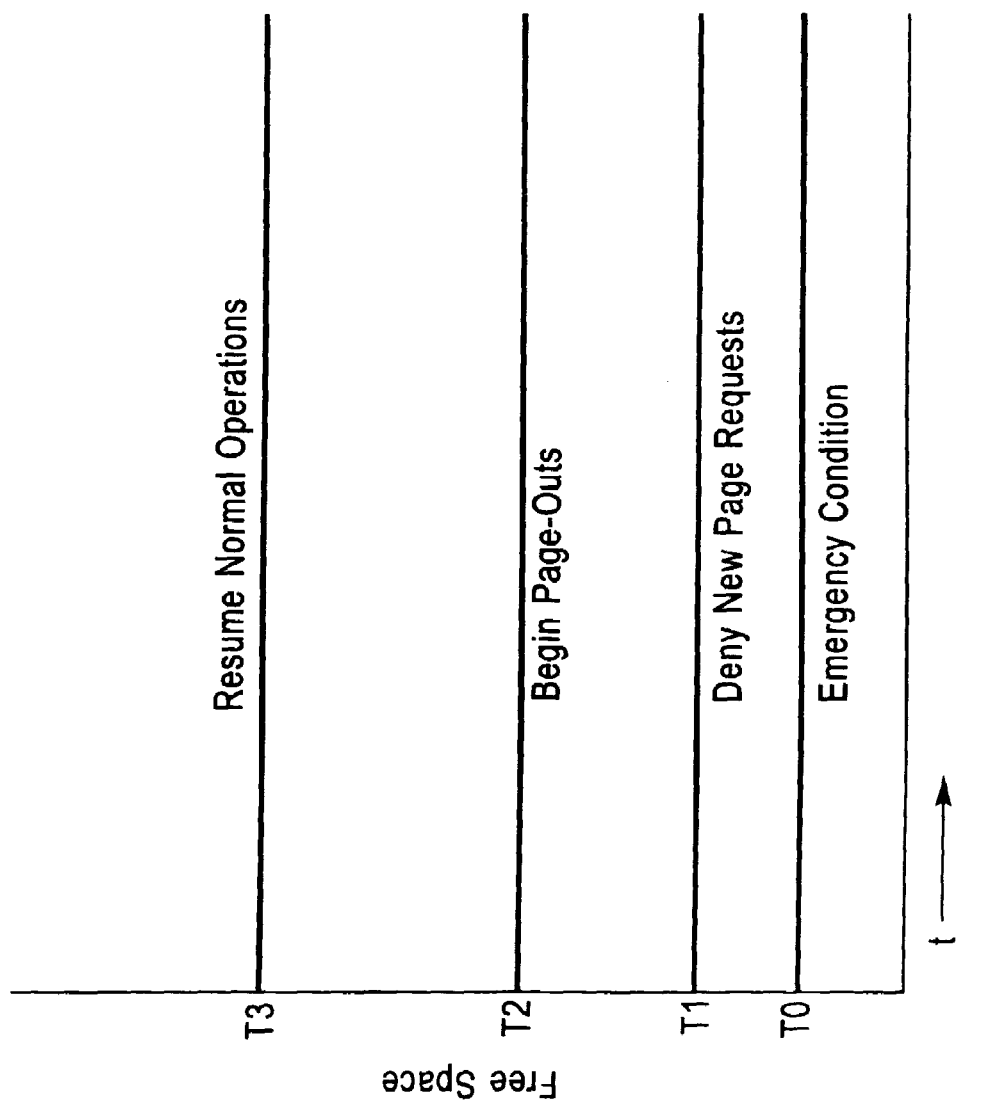
FIG. 2b depicts one example of a thresholding policy used by the space manager of FIG. 1 in a system without a Reclaim list.
Figure 5:
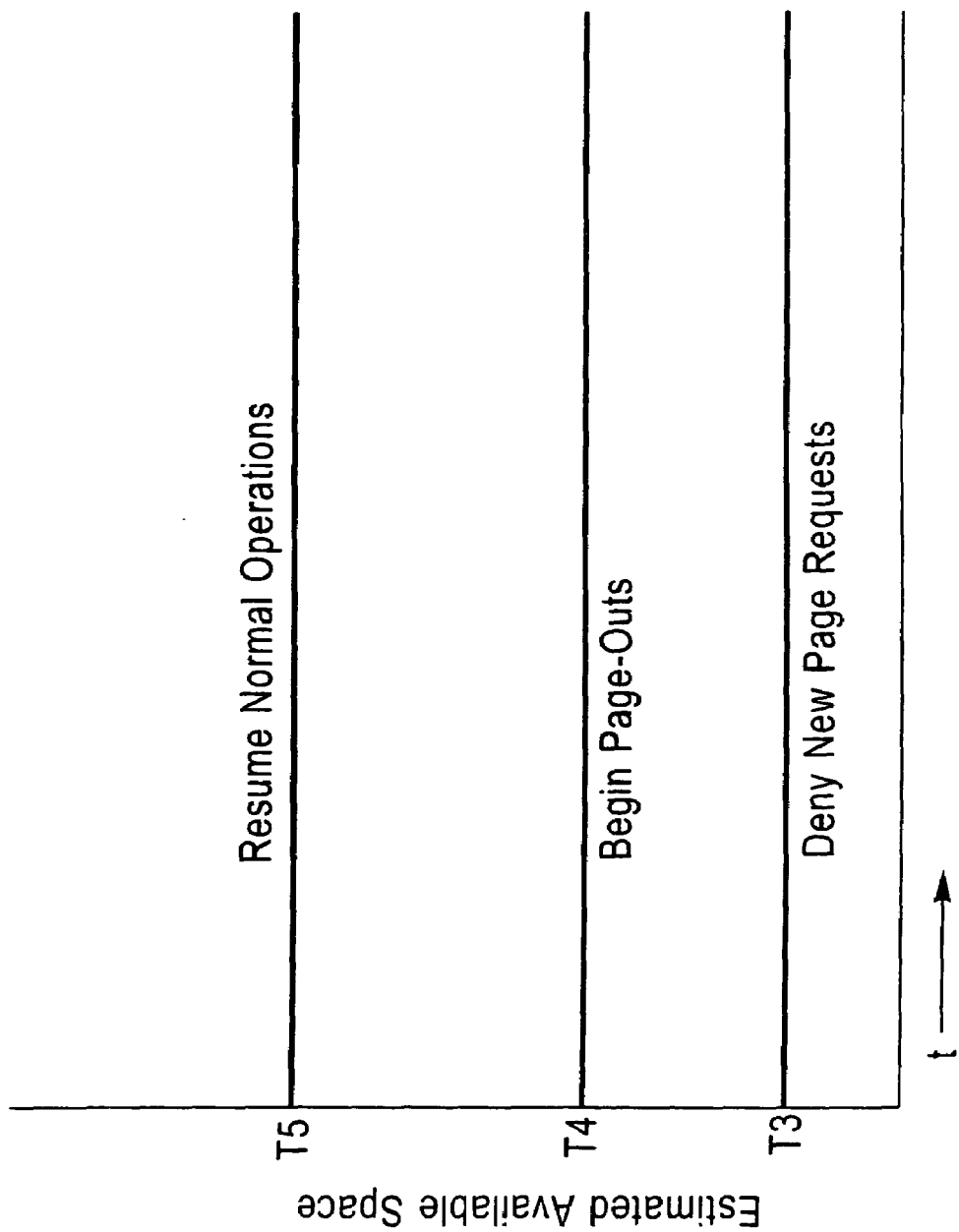
FIG. 5 depicts one example of the estimated available space thresholds for policy in a system with a Reclaim list.

In some operating systems, such as that sold by Microsoft under the trademark WINDOWS NT, there is a "Reclaim" (or "Standby") list 134 of pages (see Inside Windows NT, by Helen Custer, Microsoft Press, Chapter 6.3, (1993) (hereinafter "Inside WinNT"), which is hereby incorporated by reference herein in its entirety. Pages on the Reclaim list 134 represent page frames that can be used immediately upon request by the operating system since a valid copy of every page on the Reclaim list exists on disk (see Inside WinNT, pp. 194–198). Two distinct situations are considered: FIGS. 2*a*, 2*b* and 3 depict features of the present invention wherein the OS maintains a Reclaim list; and FIGS. 4 and 5 depict features of the present invention wherein the OS does not maintain a Reclaim list.

FIG. 2*a* depicts an example of a computerized method having features for managing compressed memory in accordance with the present invention. Those skilled in the art will appreciate that methods of the present invention may be implemented as software for execution on a computer or other processor-base device. The software may be embodied on a magnetic, electrical, optical, or other persistent program storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. As depicted, in step 200, an amount of current memory usage is determined. One or more additional measured or estimated quantities may also be determined (periodically or dynamically) for subsequent use by the free-space manager 130. For example: an estimate of the amount of allocated but unused memory; and a determination of the amount of memory required for outstanding I/O requests. The use of other measured or estimated quantities, such as the quantity of available real addresses and/or an estimate of used but available memory (in the case of a Reclaim or Standby list) will be discussed below. Estimates of allocated but unused memory may be based on one or more of: times at which pages are allocated; times at which I/O completions occur; or a cache miss ratio. Estimates of used but available memory may be based upon an estimate of the space occupied by pages that can be zeroed without being written to disk.

In step 210 of FIG. 2*a*, the free space manager dynamically sets one or more of interrupt levels and/or thresholds depending on the current memory usage and one or more of the measured and estimated quantities. The process then loops back to step 200 to (periodically or dynamically) update the measurements and/or estimates.

In step 220, if an interrupt is received or a threshold is crossed, a conceptually different process implementing control functions of the free space manager 130 responds with appropriate actions targeted at managing the amount of free space in the compressed memory 108.

In step 230, it is determined whether the amount of free space has decreased such that page-outs should begin. In step 235, if a page-out state exists, the free-space manager may responsively take one or more actions such as: control the number of pages to be written to disk; and control the number of pages to be zeroed. If a reclaim list 134 is used (described in detail below), the number of pages in a used but available state is controlled (using the reclaim list).

In step 240, it is determined whether the amount of free space has decreased such that new page requests should be granted, e.g., limited or eliminated. If yes, then in step 245, the free-space manager 130 stops granting subsequent non-essential page frame requests.

In step 250, it is determined whether the amount of free space has decreased below a level deemed to be an emergency (described below). In step 255, if an emergency state exists, then the free-space manager 130, for example, eliminates all processing except that required for zeroing pages, writing pages to disk, and pending I/O.

Processing continues (from steps 235, 245, or 255) at step 220. In step 260, it is determined whether the amount of free space has increased to a level such that normal operations may be resumed. If yes, then in step 265 the free space manager 130 resumes normal operations and the process continues at step 220.

FIG. 2b depicts one example of a thresholding policy used by the free-space space manager 130 in a system without a Reclaim list. As depicted, the free-space manager 130 can be in one of four states:

1) Normal, in which requests for new pages are granted and no page-out activity is taking place.

2) Page-out, in which requests for new pages are granted and page-out activity is taking place. During page-outs, pages are identified as being unlikely to be used soon (using standard algorithms such as FIFO, LRU or "Clock"). See for example, "The Clock Algorithm," described in A. S. Tanenbaum, Prentice-Hall, Englewood Cliffs, N.J., pp. 111 (1992), which is hereby incorporated herein by reference in its entirety. If a valid copy of a selected page exists on disk, the page in memory can be cleared (zeroed), thereby increasing the number of blocks on the free-space list 112. If a valid copy of that page does not exist on disk, it is written to disk and then can be cleared.

3) Denial, in which requests for new pages are denied (except those required for page-outs) and page-out activity is taking place.

4) Emergency, in which all processing is halted except that required to zero pages, perform page-outs, and handle pending I/O.

Preferably, the Page-out, Denial and Emergency states have a priority, with the Emergency state having the highest priority, Denial the second highest, and Page-out the lowest.

The free-space manager 130 uses threshold (T0 . . . T3) crossings on the amount of free space to determine when to change state, thereby controlling page-out and page allocation activity. The thresholds (T0 . . . T3) may change over time depending upon conditions within the system. The thresholds (T0 . . . T3) are denoted at time t by $T0(t)$, $T1(t)$, $T2(t)$, and $T3(t)$. The amount of free space F within the memory at time t is denoted by F(t).

The free-space manager 130 preferably also maintains:

1) An estimate, G(t), of F(t). The estimate G(t) may be obtained either by using the most recently measured value of F(t) (such measurements being taking periodically or upon events such as page frame requests or I/O completions), or by ensuring that the compression controller 106 signals interrupts when F(t) changes by a certain amount.

2) A count, M(t), of the number of page frames currently in use.

3) An estimate, v(t), of the amount of allocated but unused storage. This may require monitoring other system quantities such as the cache miss ratio, page allocation times, etc.

4) A bound, I(t), on the maximum amount of storage needed to satisfy all outstanding incoming I/O requests. The bound I(t) may be increased whenever a page-in is started, and decreased on completion, or it may be changed more slowly. For example, it may be set sufficiently high so that it need not be changed provided the number of pages required for incoming I/O is less than some constant.

Here, the free-space manager 130 uses the thresholds (T0 . . . T3) as follows:

1) $T0(t)$—enter the Emergency state. $T0(t)$ is the number of free blocks at which the compression controller 106 uses an interrupt to stop all current processing, except that required to perform page-outs, zeroing and handle pending I/O. More specifically, the controller issues an interrupt whenever F(t) is below $T0(t)$. Upon receipt of such an interrupt, the Emergency state is entered.

2) $T1(t)$—enter the Denial state (provided not in a higher priority state). If the estimated number of free blocks is reduced to $T1(t)$, the free-space manager 130 will not give out any pages to requesting programs, except those necessary for page-out functions. This state is entered from the Page-out state. An interrupt from the controller 106 corresponding to $T1(t)$ need not be issued, since the free-space manager can query the controller 106 upon a page allocation request.

3) $T2(t)$–Enter the Page-out state (provided not in a higher priority state). $T2(t)$ is the number of free blocks below which page-outs are initiated. More specifically, the controller issues an interrupt whenever F(t) is reduced to $T2(t)$.

4) $T3(t)$—Enter the Normal state. $T3(t)$ is the number of free blocks at which page-outs are stopped and the free-space manager resumes granting new page requests. (A separate state and threshold, $T4(t)$, could also be used to define when to resume granting new requests but to continue page-outs. This is not depicted here, for the sake of simplicity.) An interrupt from the controller 106 corresponding to $T3(t)$ need not be issued, since the free-space manager 130 can query the controller upon completion of a certain number of page-outs.

The priorities advantageously ensure that, e.g., the free-space manager 130 stays in the Emergency state until reaching the Normal state threshold, $T3(t)$. This same effect could be accomplished by, e.g., disabling the interrupt associated with $T2(t)$ (or resetting a register in the controller 106 such that the interrupt is not generated) and ignoring down-crossings of $T1(t)$ while in the Emergency state.

The thresholds may be set or changed dynamically (at appropriate times) by the free-space manager 130, for example upon I/O completions and page allocations. The overhead of setting thresholds dynamically, which in the case of $T0(t)$ and $T2(t)$ preferably involves setting registers 120 in the controller, may be reduced using standard techniques. For example, by appropriately updating the thresholds every k-th I/O completion for some k>1.

When page-outs are initiated (e.g., upon crossing threshold $T2(t)$), page-out of some number of pages U is started, where U is the number expected to be required to reach level $T3(t)$. This number may be augmented, or page-outs not underway stopped when $T3(t)$ is reached.

The threshold $T0(t)$ can be set as follows. Let N1 be a bound on the amount by which storage may be increased during the process of stopping all processors by the interrupt associated with T0 and paging out sufficient pages to reach the threshold $T3(t)$. Let I(t) be a bound on the amount by which storage may be increased due to any outstanding page-ins, that is, the number of page-ins started but not yet completed. Then $T0(t)>=N1+I(t)$ is sufficient to ensure that the system will not abend due to a shortage of space. N1 is a fixed, system-dependent quantity. (Since "pinned" pages may not be paged out, the above inequality effectively limits the total number of pages that may be pinned, or required to be resident in memory, by the operating system. Specifically, if the memory consists of M blocks, then the maximum amount of memory occupied by pinned pages, regardless of their compressibility, cannot exceed $M-T0(t)$ blocks. Throughout, we assume the free-space manager 130 enforces this constraint by rejecting requests to pin pages if the constraint is in danger of being violated.)

Values for T1(t), T2(t), T3(t) are a combination of: T0(t); inter-threshold base distances, D1, D2 and D3 (not shown); and an estimate v(t) for the amount of allocated but unused storage. The quantity v(t) is an estimate of the effect of pages which have been or will be modified, but whose modified versions have not yet been flushed from the cache 104. In most systems of the type considered here, the cache residency time is expected to be considerably longer than the time between page allocation and either page usage or modification. More specifically: $T1(t)=T0(t)+D1+v(t)$; $T2(t)=T1(t)+D2$; and $T3(t)=T2(t)+D3$, where D1, D2 and D3 may be dynamically set.

In the current example, base distance D1 is preferably set just large enough to make it sufficiently unlikely that the number of free blocks is reduced to T0(t) (thereby entering the Emergency condition). This may be done in a variety of ways, including indirect measurements of the I/O rate relative to memory expansion rate during page-outs. Similarly, D2 should be set just large enough to make it sufficiently unlikely to enter the Denial state from the Page-out state. D3 should be set large enough so that the Page-out state is not entered too often from the Normal state, but small enough so that space is not wasted. D1, D2 and D3 may depend on system measurements such as estimated compression ratios, the fraction of time the free-space manager is in each of its states, I/O rates, etc.

As mentioned above, during system operation, base values for the thresholds 132 above T0(t) are modified by adding an estimate v(t) for committed but as yet unused storage to obtain T1(t), T2(t) and T3(t). There are a variety of ways of formulating a suitable value for v(t). The one chosen here is: $v(t)=\Sigma b(i) n(i) s(t-t(i))$, where n(i) is the number of pages which are allocated or have page-ins completed at time t(i), b(i) is an estimate of the average number of blocks each such page will eventually occupy in storage, and Sigma denotes summation over all i for which $t(i)<=t$. If the value s(t-t(i)) is represented by a function s(y), then (in this example) $s(y)=\exp(-y r)$, for some smoothing parameter r, which may change dynamically depending on system conditions (such as the cache miss ratio or an estimate of the mean cache residency time). The quantity v(t) is updated periodically, and also at times of page allocation or I/O completion. If the update causes a change in v(t) of more than some number K0 blocks, the thresholds T1(t), T(2) and T(3) are modified.

In summary:

a) Page allocation and page-in/pageout activity is controlled by thresholds on the number of free blocks F. Crossing these thresholds preferably cause a processor interrupt.

b) Each threshold value consists of a base amount or distance, plus possibly a modifier, which represents quantities such as page-in activity and allocated but unused storage, plus the Emergency condition level. The thresholds may be changed dynamically.

c) The base distances D1, D2, and D3 may be set according to system measurements.

FIG. 3 depicts an example of a control process starting at some time t0, as applied to the thresholding policy of FIG. 2. It is assumed that during the interval from t0 . . . t1, base distances D1, D2, D3 are unchanged. It is further assumed that changes in v(t) (estimated committed but as yet unused storage) and I(t) (the bound on the amount by which storage may be increased due to the number of page-ins started but not yet completed) are small enough over the time interval (t0,t1) so that all thresholds (T0 . . . T3) remain constant during this interval. As depicted, the Free Space within the memory at time t, F(t) first starts a decreasing trend (with some oscillations), then eventually reaches the threshold T2(t). This causes a processor interrupt, and the free-space manager 130 is invoked. The free-space manager 130 begins the page-out process, which will be terminated when F(t) reaches T3(t). Initially, in the illustration, there is a delay in the start of page-outs, and a rapid expansion of the memory contents due to compressibility changes. This causes F(t) to reach T1(t), at which point new page requests are denied and no further page-ins initiated. Fluctuations continue, with an upward trend in F(t). At time t1, a significant increase in v(t) is detected, necessitating an increase in T1(t), T2(t) and T3(t), which then remain constant for the rest of the time period shown. F(t) continues its upward trend until T3(t) is reached. Here page-outs are stopped, and page allocation is resumed.

In the above example, the free-space manager has four states. One skilled in the art will appreciate that it is within the spirit and scope of the present invention, in a multiprocessor environment, to add new states and thresholds in which, for example, page-outs are in progress but only some of the processors are allowed to continue normal execution.

Modifications for Operating Systems with a "Reclaim" List

As described earlier, some operating systems, such as Microsoft's WINDOWS NT, maintain a "Reclaim" (or "Standby") list of pages. Similarly, there may be a "Free" list (pages which are free but which have not been cleared) and a "Zeroed" list of pages which have been cleared. The free-space manager 130 may take advantage of the Reclaim and Free lists as a ready source of storage that can be easily zeroed. Thus it may view the storage represented by pages on the Reclaim and Free lists as being "used, but available." The following describes a version of the free-space manager 130 in a system implementing storage functions like Reclaim and Free lists.

Define R(t) to be an estimate of the total amount of storage used by pages on the Reclaim and Free lists: R(t) may be estimated in a variety of ways (e.g., by simply using the overall estimate of the compression ratio) or known exactly if the compression controller 106 provides the free-space manager 130 with the exact storage used by each page as it is put on or taken off the list. Define A(t) to be an estimate of the amount of available storage: $A(t)=G(t)+R(t)-v(t)-I(t)$. The free-space manager 130 now bases decisions on both A(t) and F(t).

By way of overview, when Free Space F(t) becomes low, the free-space manager 130 creates free space inside the memory 108 by removing pages from the Free and/or Reclaim List 134, clearing (zeroing) them, and putting the page frame address on a Zeroed list. If the Free and Reclaim lists are empty, it must wait until they are not empty. This continues until F(t) reaches a sufficient level. This set of operations is referred to as zeroing. Hardware interrupts from the compression controller 106 can be used to signal when to begin zeroing and when to enter the Emergency state, in which all processing is stopped except that for zeroing, page-outs, and pending I/O.

When the available storage estimate A(t) becomes low, the free-space manager 130 increases available space by putting pages on the Reclaim list 134, i.e., writing some pages to disk, if necessary, and putting the pages on the Reclaim list until A(t) reaches a sufficient level. In contrast to a system without a Reclaim list, such pages are not necessarily zeroed immediately after being written to disk. This is referred to as performing Page-outs. If A(t) is reduced further to a certain level, new page requests from the operating system 125 are denied. As Page-outs and zeroing may happen simultaneously, an appropriate locking structure must be introduced to ensure correct operation. In a preferred embodiment, there are 6 thresholds, $T0(t)$, $T5(t)$, as shown in FIGS. 4 and 5.

FIG. 4 depicts another example of free space thresholds in accordance with the present invention. As depicted: T0 is the Emergency Condition threshold; T1 is the threshold at which zeroing is begun; and T2 is the threshold at which zeroing is stopped. $T0(t)$, $T1(t)$ and $T2(t)$, are the respective thresholds for the amount of Free Space at time t, F(t).

FIG. 5 depicts an example of estimated available space thresholds in accordance with the present invention. As depicted: T3 is a threshold at which new page requests are denied; T4 is a threshold at which page-outs are begun; and T5 is a threshold at which normal operations are resumed. $T3(t)$, $T4(t)$ and $T5(t)$ are the respective thresholds for the estimated available space at time t, A(t).

An example of a control process for managing compressed memory as a time function of both the Free Space F(t) and the estimated available space A(t) will now be described with reference to FIG. 4 and FIG. 5.

1) $T0(t)$ is set as before. When F(t) reaches $T0(t)$, the Emergency Condition (also called the Emergency state) is entered (by signaling an interrupt), all non-zeroing and non-page-out activity is stopped. If (at the time of the interrupt) the estimated available space $A(t)>T3(t)$, then the free-space manager 130 stays in the Emergency state and continues Zeroing until $F(t)>=T2(t)$. If $A(t)<=T3(t)$, then the free-space manager stays in the Emergency state until $F(t)>=T2(t)$ and $A(t)>=T5(t)$.

2) $T1(t)=T0(t)+v(t)+D1$. When F(t) reaches $T1(t)$, a hardware interrupt is issued and Zeroing is begun until $F(t)>=T2(t)$.

3) $T2(t)=T1(t)+D2$. Zeroing stops when $F(t)>=T2(t)$.

4) $T3(t)=T0(t)+D3$. When $A(t)<=T3(t)$ (which can be detected in software), a state similar to the Denial state (FIG. 2) is entered in which no new page frames are allocated (except for page-out purposes) and Page-outs continue until $A(t)>=T5(t)$.

5) $T4(t)=T3(t)+D4$. When $A(t)<=T4(t)$ (which can be detected in software), page-outs begin until $A(t)>=T5(t)$.

6) $T5(t)=T4(t)+D5$. Page-outs cease when $A(t)>=T5(t)$ (which can be detected in software).

Inter-threshold base distances D1 and D2 are preferably set so that it is sufficiently unlikely to enter the Emergency state. If the Emergency state can be exited by zeroing only, i.e., without page-outs, then the time all processors are stopped due to the Emergency state is small. However, this time is large if page-outs are also required to exit the Emergency state. Thus D3, D4 and D5 should be set to make it unlikely that the Reclaim and Free lists are exhausted during Zeroing. The parameters D1, . . . , D5 may be set dynamically set according to system measurements such as I/O rates, variations in compressibility, etc.

Systems with a Limited Number of Addressable Page Frames

Many operating systems, such as are sold by IBM under the trademark AIX or by Microsoft under the trademark WINDOWS NT, build data structures of fixed size to support virtual memory upon system initialization. In particular, the data structure describing real memory (in WINDOWS NT, the page frame database) supports a fixed number of real page frames that can be addressed. When such a system is used along with compression, the situation may arise that there is plenty of free space available, but the number of available page frame addresses is low. In this case, as in a system without compression, the operating system's normal actions (e.g., Page-outs) would take place to deal with this situation. The denying of page frames by the free-space manager 130 as described above leads to a situation in which the number of available page frame addresses is low. However, the actions described above ensure that eventually enough space becomes available to again grant page requests. Thus, the free-space manager described above can coexist with an existing operating system's controls based on the number of available page frame addresses. For example, suppose the operating system is doing page-outs to gain page frame addresses and a compression Emergency Condition is signaled. Then all nonessential processing stops, and page-outs (and zeroing) continue until there are simultaneously enough page frame addresses, estimated available storage and actual free storage available.

The present invention includes features, for example the free-space manager, which can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The system and processes depicted herein are just exemplary. There may be many variations to the drawings or the steps (or operations) described with reference thereto without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

We claim:

1. In a computer system including a compressed memory wherein a unit of memory allocation can occupy a variable amount of physical memory space, said compressed memory being a main memory unit of said computer system, a method of managing the compressed memory, said method comprising:

determining an amount of current memory usage in said main memory;

storing the determined current memory usage amount in a continuously-updated counter;

estimating an amount of allocated but unused memory; and managing the compressed memory as a function of at least one of the current memory usage and the amount of allocated but unused memory, said managing comprising:

setting at least one interrupt level and threshold, depending on one or more of measured and estimated quantities, including at least one of the current memory usage and the allocated but unused memory; and responding to crossings of said at least one interrupt level and threshold, depending on said one or more of measured and estimated quantities.

2. The method of claim 1, further comprising:
estimating used but available memory; and
said managing including managing memory as a function of said used but available memory.

3. The method of claim 1, further comprising:
managing memory as a function of the maximum memory usage of pinned pages.

4. The method of claim 1, wherein said unit is a page, wherein said managing further comprises:
limiting the number of pages that may be resident in memory.

5. The method of claim 1, further comprising:
determining an the amount of memory required for outstanding I/O requests; and
managing the compressed memory as a function of the current memory usage and the amount of memory required for outstanding input/output (I/O) requests.

6. The method of claim 1, said managing further comprising:
managing the compressed memory as a function of a quantity of available real addresses.

7. The method of claim 1, wherein said
setting of at least one of said at least one interrupt level and threshold comprises a dynamic setting.

8. The method of claim 1, wherein said one or more of measured and estimated quantities includes at least one of:
an amount of memory required for outstanding input/output (I/O) requests;
an amount of used but available memory; and
available real addresses.

9. The method of claim 1, wherein said unit is a page and wherein said managing further comprises:
determining whether a request for a page can be granted.

10. The method of claim 1, wherein said unit is a page and wherein said managing further comprises:
controlling a number of pages to be written to disk.

11. The method of claim 1, wherein said unit is a page, wherein said managing further comprises:
controlling a number of pages to be zeroed.

12. The method of claim 2, wherein said unit is a page and wherein said managing further comprises:
controlling the number of pages in a used but available state by using a reclaim list.

13. The method of claim 1, wherein said unit is a page and wherein said managing further comprises:
entering an emergency state; and
eliminating all processing except that required for zeroing pages, writing pages to disk, and pending input/output (I/O).

14. The method of claim 13, wherein said managing further comprises:
exiting the emergency state and resuming normal operations.

15. The method of claim 1, wherein said unit is a page and wherein said estimating of allocated but unused memory is based on one or more of:
times at which pages are allocated;
times at which input/output (I/O) completions occur; and
a cache miss ratio.

16. The method of claim 2, wherein said unit is a page, said estimating of used but available memory is based upon an estimate of the space occupied by pages that can be zeroed without being written to disk.

17. In a computer system including a compressed memory wherein a unit of memory allocation can occupy a variable amount of physical memory space, a method of managing the compressed memory, said method comprising:
determining an amount of current memory usage;
determining an amount of memory required for outstanding input/output (I/O) requests; and
managing the compressed memory as a function of the current memory usage and the amount of memory required for outstanding I/O requests.

18. The method of claim 17, further comprising:
estimating used but available memory; and
said managing including managing memory as a function of said used but available memory.

19. The method of claim 17, further comprising:
managing memory as a function of the maximum memory usage of pinned pages.

20. The method of claim 17, wherein said unit is a page, wherein said managing further comprises:
limiting the number of pages that may be resident in memory.

21. The method of claim 17, further comprising:
estimating an amount of allocated but unused memory; and
managing the compressed memory as a function of the current memory usage and the amount of allocated but unused memory.

22. The method of claim 17, said managing further comprising:
managing the compressed memory as a function of a quantity of available real addresses.

23. The method of claim 17, wherein said managing further comprises:
dynamically setting one or more of interrupt levels and thresholds depending on one or more of measured and estimated quantities including the current memory usage and the allocated but unused memory; and
responding to said interrupts and threshold crossings, depending on said one or more of measured and estimated quantities.

24. The method of claim 19, wherein said one or more of measured and estimated quantities includes at least one of:
an amount of memory required for outstanding I/O requests;
an amount of used but available memory; and
available real addresses.

25. The method of claim 17, wherein said unit is a page and wherein said managing further comprises:
determining whether a request for a page can be granted.

26. The method of claim 17, wherein said unit is a page and wherein said managing further comprises:
controlling a number of pages to be written to disk.

27. The method of claim 17, wherein said unit is a page, wherein said managing further comprises:
controlling a number of pages to be zeroed.

28. The method of claim 18, wherein said unit is a page and, wherein said managing further comprises:
controlling the number of pages in a used but available state by using a reclaim list.

29. The method of claim 17, wherein said unit is a page and wherein said managing further comprises:
entering an emergency state eliminating all processing except that required for zeroing pages, writing pages to disk, and pending I/O.

30. The method of claim 29, wherein said managing further comprises:
exiting the emergency state and resuming normal operations.

31. The method of claim 21, wherein said unit is a page and wherein said estimating of allocated but unused memory is based on one or more of:

times at which pages are allocated;
times at which I/O completions occur; and
a cache miss ratio.

32. The method of claim 18, wherein said unit is a page, said estimating of used but available memory is based upon an estimate of the space occupied by pages that can be zeroed without being written to disk.

33. A computer system for managing a compressed memory wherein a unit of memory allocation can occupy a variable amount of physical memory space, said compressed memory being a main memory unit of said computer system, said computer system comprising:
  means for determining an amount of current memory usage in said main memory and storing said amount in a continuously-updated counter;
  means for estimating an amount of allocated but unused memory; and
  a free-space manager, coupled to said means for determining and said means for estimating, for managing the compressed memory as a function of at least one of the current memory usage and the amount of allocated but unused memory, said managing comprising:
    setting at least one interrupt level and threshold, depending on one or more of measured and estimated quantities, including at least one of the current memory usage and the allocated but unused memory; and
    responding to crossings of said at least one interrupt level and threshold, depending on said one or more of measured and estimated quantities.

34. The system of claim 33, further comprising:
  means for estimating used but available memory; and
  said free-space manager, coupled to said means for estimating, including means for managing memory as a function of said used but available memory.

35. The system of claim 33, wherein said free-space manager comprises:
  means for managing memory as a function of the maximum memory usage of pinned pages.

36. The system of claim 33, wherein said unit is a page, wherein said free-space manager comprises:
  means for limiting the number of pages that may be resident in memory.

37. The system of claim 33, further comprising:
  means for determining an the amount of memory required for outstanding input/output (I/O) requests; and
  said free-space manager including means for managing the compressed memory as a function of the current memory usage and the amount of memory required for outstanding I/O requests.

38. The system of claim 33, wherein said free-space manager comprises means for managing the compressed memory as a function of a quantity of available real addresses.

39. The system of claim 35, wherein said one or more of measured and estimated quantities includes at least one of:
  an amount of memory required for outstanding I/O requests;
  an amount of used but available memory; and
  available real addresses.

40. The system of claim 33, wherein said unit is a page and wherein said free-space manager comprises:
  means for determining whether a request for a page can be granted.

41. The system of claim 33, wherein said unit is a page and wherein said free-space manager further comprises:
  means for controlling a number of pages to be written to disk.

42. The system of claim 33, wherein said unit is a page, wherein said free-space manager comprises:
  means for controlling a number of pages to be zeroed.

43. The system of claim 34, wherein said unit is a page and wherein said free-space manager further comprises:
  a reclaim list of pages representing page frames for which a valid copy exists on disk; and
  means for controlling the number of pages in a used but available state by using the reclaim list.

44. The system of claim 33, wherein said unit is a page and wherein said free-space manager comprises:
  means for detecting and entering an emergency state; and
  means for eliminating all processing, coupled to said means for detecting and entering an emergency state, except that required for one or more of:
    zeroing pages,
    writing pages to disk, and
    pending I/O.

45. The system of claim 44, wherein said free-space manager further comprises:
  means for exiting the emergency state; and
  means for resuming normal operations, coupled to said means for exiting the emergency state.

46. The system of claim 33, wherein said unit is a page and wherein said means for estimating an amount allocated but unused memory is based on one or more of:
  times at which pages are allocated;
  times at which I/O completions occur; and
  a cache miss ratio.

47. The system of claim 34, wherein said unit is a page and wherein said means for estimating an amount of used but available memory includes means for estimating an amount of space occupied by pages that can be zeroed without being written to disk.

48. A computer system for managing a compressed memory wherein a unit of memory allocation can occupy a variable amount of physical memory space, said computer system comprising:
  means for determining an amount of current memory usage;
  means for determining an amount of memory required for outstanding input/output (I/O) requests; and
  a free-space manager for managing the compressed memory as a function of the current memory usage and the amount of memory required for outstanding I/O requests.

49. The system of claim 48, further comprising:
  means for estimating used but available memory; and
  said free-space manager including means for managing memory as a function of said used but available memory.

50. The system of claim 48, wherein said free-space manager comprises:
  means for managing memory as a function of the maximum memory usage of pinned pages.

51. The system of claim 48, wherein said unit is a page and wherein said free-space manager comprises:
  means for limiting the number of pages that may be resident in memory.

52. The system of claim 48, further comprising:
  means for estimating an amount of allocated but unused memory; and
  means for managing the compressed memory as a function of the current memory usage and the amount of allocated but unused memory.

53. The system of claim 48, wherein said free-space manager comprises:
means for managing the compressed memory as a function of a quantity of available real addresses.

54. The system of claim 48, wherein said free-space manager comprises:
means for dynamically setting one or more of interrupt levels and thresholds depending on one or more of measured and estimated quantities including the current memory usage and the allocated but unused memory; and
means for responding to said interrupts and threshold crossings, depending on said one or more of measured and estimated quantities.

55. The system of claim 50, wherein said one or more of measured and estimated quantities includes at least one of:
an amount of memory required for outstanding I/O requests;
an amount of used but available memory; and
available real addresses.

56. The system of claim 48, wherein said unit is a page and wherein said free-space manager comprises:
means for determining whether a request for a page can be granted.

57. The system of claim 48, wherein said unit is a page and wherein said free-space manager comprises:
means for controlling a number of pages to be written to disk.

58. The system of claim 48, wherein said unit is a page, wherein said free-space manager comprises:
means for controlling a number of pages to be zeroed.

59. The system of claim 49, wherein said unit is a page and, wherein said free-space manager comprises:
a reclaim list of pages representing page frames for which a valid copy exists on disk; and
means for controlling a number of pages in a used but available state by using the reclaim list.

60. The system of claim 48, wherein said unit is a page and wherein said free-space manager comprises:
means for detecting and entering an emergency state; and
means for eliminating all processing, coupled to said means for detecting and entering, except that required for zeroing pages, writing pages to disk, and pending I/O.

61. The system of claim 50, wherein said free-space manager further comprises:
means for detecting a resume normal state; and
means for exiting the emergency state and resuming normal operations, coupled to said means for detecting a resume normal state.

62. The system of claim 52, wherein said unit is a page and wherein said means for estimating an amount of allocated but unused memory is based on one or more of:
times at which pages are allocated;
times at which I/O completions occur; and
a cache miss ratio.

63. The system of claim 49, wherein said unit is a page and wherein said means for estimating used but available memory is based upon an estimate of the space occupied by pages that can be zeroed without being written to disk.

64. The system of claim 54, wherein said means for dynamically setting one or more of interrupt levels and thresholds comprises:
means for setting inter-threshold distances based on one or more of:
estimated compression ratios;
the fraction of time said free-space manager is in each of its states; and
I/O rates.

65. A computer system for managing a compressed memory wherein a unit of memory allocation can occupy a variable amount of physical memory space, said computer system comprising:
at least one processor;
at least one cache coupled to the at least one processor;
said units of memory being organized as pages, blocks, and lines;
a compression controller coupled to the cache and the compressed memory;
a plurality of interrupt registers and a free-space list, coupled to said compression controller;
means for determining an amount of current memory usage, coupled to the compression controller;
means for estimating an amount of allocated but unused memory, coupled to the compression controller; and
a free-space manager coupled to the at least one processor and to the compression controller, for managing the compressed memory as a function of the current memory usage and the amount of allocated but unused memory;
said compression controller including:
means for compressing lines which are cast out of the cache and storing the results in a number of fixed-size blocks drawn from the free-space list;
means for decompressing lines on cache fetches;
means for adding blocks freed by operations, including any of removing a line from memory, and compressing a changed line which now uses less space, to the free-space list;
means for maintaining a count F of a number of blocks on the free-space list, said count being available to the free-space manager; and
means for maintaining a set of thresholds in said interrupt registers, said thresholds indicating a size of F, wherein crossing said thresholds causes a processor interrupt; and
said free-space manager further including:
means for maintaining an appropriate number of blocks on the free-space list;
means for dynamically setting one or more of interrupt levels and thresholds depending on one or more of measured and estimated quantities including the current memory usage and the allocated but unused memory; and
means for responding to said interrupts and threshold crossings depending on said one or more of measured and estimated quantities.

66. A computer program storage device readable by a machine, tangibly embodying a program of instructions executable by the machine to perform a method for managing a compressed memory wherein a unit of memory allocation can occupy a variable amount of physical memory space, said compressed memory being a main memory unit of a computer, said method comprising:
determining an amount of current memory usage of said main memory;
storing said main memory current memory amount in a counter;
estimating an amount of allocated but unused memory; and managing the compressed memory as a function of at least one of the current memory usage and the amount of allocated but unused memory, said managing comprising:

setting at least one interrupt level and threshold, depending on one or more of measured and estimated quantities, including at least one of the current memory usage and the allocated but unused memory; and responding to crossings of said at least one interrupt level and threshold, depending on said one or more of measured and estimated quantities.

67. The computer program storage device of claim 66, said method further comprising:

estimating used but available memory; and said managing including managing memory as a function of said used but available memory.

68. The computer program storage device of claim 66, said method further comprising:

managing memory as a function of the maximum memory usage of pinned pages.

69. The computer program storage device of claim 66, wherein said unit is a page, wherein said managing further comprises:

limiting the number of pages that may be resident in memory.

70. The computer program storage device of claim 66, said method further comprising:

determining an the amount of memory required for outstanding input/output (I/O) requests; and managing the compressed memory as a function of the current memory usage and the amount of memory required for outstanding I/O requests.

71. The computer program storage device of claim 66, said managing further comprising:

managing the compressed memory as a function of a quantity of available real addresses.

72. The computer program storage device of claim 66, wherein said managing further comprises:

dynamically setting one or more of interrupt levels and thresholds depending on one or more of measured and estimated quantities including the current memory usage and the allocated but unused memory; and responding to said interrupts and threshold crossings depending on said one or more of measured and estimated quantities.

73. The computer program storage device of claim 68, wherein said one or more of measured and estimated quantities includes at least one of:

an amount of memory required for outstanding I/O requests;

an amount of used but available memory; and available real addresses.

74. The computer program storage device of claim 66, wherein said unit is a page and wherein said managing further comprises:

determining whether a request for a page can be granted.

75. The computer program storage device of claim 66, wherein said unit is a page and wherein said managing further comprises:

controlling a number of pages to be written to disk.

76. The computer program storage device of claim 66, wherein said unit is a page, wherein said managing further comprises:

controlling a number of pages to be zeroed.

77. The computer program storage device of claim 67, wherein said unit is a page and wherein said managing further comprises:

controlling the number of pages in a used but available state by using a reclaim list.

78. The computer program storage device of claim 66, wherein said unit is a page and wherein said managing further comprises:

entering an emergency state; and eliminating all processing except that required for zeroing pages, writing pages to disk, and pending I/O.

79. The computer program storage device of claim 78, wherein said managing further comprises:

exiting the emergency state and resuming normal operations.

80. The computer program storage device of claim 66, wherein said unit is a page and wherein said estimating of allocated but unused memory is based on one or more of:

times at which pages are allocated;

times at which I/O completions occur; and a cache miss ratio.

81. The computer program storage device of claim 67, wherein said unit is a page, said estimating of used but available memory is based upon an estimate of the space occupied by pages that can be zeroed without being written to disk.

82. In a computer system including a compressed memory wherein a unit of memory allocation can occupy a variable amount of physical memory space, a method of managing the compressed memory, said method comprising:

determining an amount of current memory usage;

determining an amount of memory required for outstanding I/O requests; and managing the compressed memory as a function of the current memory usage and the amount of memory required for outstanding input/output (I/O) requests.

83. The computer program storage device of claim 82, said method further comprising:

estimating used but available memory; and said managing including managing memory as a function of said used but available memory.

84. The computer program storage device of claim 82, said method further comprising:

managing memory as a function of the maximum memory usage of pinned pages.

85. The computer program storage device of claim 82, wherein said unit is a page, wherein said managing further comprises:

limiting the number of pages that may be resident in memory.

86. The computer program storage device of claim 82, said method further comprising:

estimating an amount of allocated but unused memory; and managing the compressed memory as a function of the current memory usage and the amount of allocated but unused memory.

87. The computer program storage device of claim 82, said managing further comprising:

managing the compressed memory as a function of a quantity of available real addresses.

88. The computer program storage device of claim 82, wherein said managing further:

dynamically setting one or more of interrupt levels and thresholds, depending on one or more of measured and estimated quantities, including the current memory usage and the allocated but unused memory; and responding to said interrupts and threshold crossings depending said one or more of measured and estimated quantities.

89. The computer program storage device of claim 84, wherein said one or more of measured and estimated quantities includes at least one of:
an amount of memory required for outstanding I/O requests;
an amount of used but available memory; and
available real addresses.

90. The computer program storage device of claim 82, wherein said unit is a page and wherein said managing further comprises:
determining whether a request for a page can be granted.

91. The computer program storage device of claim 82, wherein said unit is a page and wherein said managing further comprises:
controlling a number of pages to be written to disk.

92. The computer program storage device of claim 82, wherein said unit is a page, wherein said managing further comprises:
controlling a number of pages to be zeroed.

93. The computer program storage device of claim 83, wherein said unit is a page and, wherein said managing further comprises:
controlling the number of pages in a used but available state by using a reclaim list.

94. The computer program storage device of claim 82, wherein said unit is a page and wherein said managing further comprises:
entering an emergency state eliminating all processing except that required for zeroing pages, writing pages to disk, and pending I/O.

95. The computer program storage device of claim 29, wherein said managing further comprises:
exiting the emergency state and resuming normal operations.

96. The computer program storage device of claim 86, wherein said unit is a page and wherein said estimating of allocated but unused memory is based on one or more of:
times at which pages are allocated;
times at which I/O completions occur; and
a cache miss ratio.

97. The computer program storage device of claim 83, wherein said unit is a page, said estimating of used but available memory is based upon an estimate of the space occupied by pages that can be zeroed without being written to disk.

* * * * *